United States Patent

Samworth

[11] Patent Number: 5,892,588
[45] Date of Patent: Apr. 6, 1999

[54] DIGITAL HALFTONING COMBINING DOT SIZE MODULATION SCREEN WITH DOT FREQUENCY MODULATION SCREEN WITHIN A SINGLE IMAGE

[75] Inventor: Mark R. Samworth, Wilmington, Del.

[73] Assignee: Professional Software Technologies Inc., Bristol, Pa.

[21] Appl. No.: 942,795

[22] Filed: Oct. 2, 1997

[51] Int. Cl.[6] .............................. H04N 1/40; B41J 15/00
[52] U.S. Cl. ........................ 358/298; 358/456; 395/109
[58] Field of Search .................................. 358/298, 456, 358/458, 459; 395/109

[56] References Cited

U.S. PATENT DOCUMENTS

| | | | |
|---|---|---|---|
| 5,625,755 | 4/1997 | Shu | 395/109 |
| 5,694,224 | 12/1997 | Tai | 358/455 |
| 5,726,722 | 3/1998 | Parker et al. | 358/456 |

Primary Examiner—Peter S. Wong
Assistant Examiner—Gregory J. Toatley, Jr.
Attorney, Agent, or Firm—John J. Simkanich

[57] ABSTRACT

An apparatus and method of producing enhanced digital imaging for printing data or reproduction process data (digital camera data) from the combination of dot size (amplitude) and dot density (frequency) halftone screens, whereof each halftone screen represents continuous "gray tone" (grey tone) input image levels. The method includes creating a dot frequency modulation (FM modulation—dispersed dot technique) in lighter areas which otherwise would require a dot size which is below user definable "dot size limit". This dot frequency modulation randomly deletes dots from the dot area modulation screen (AM modulation—cluster dot technique) in these lighter areas. The percentage of frequency modulation is graduated over the range of gray values which reduces objectionable visual transitions. Enhanced overall definition over the gray scale range of 0 to 100 percent (i.e., where 100 is equal to "255" in 8-bit environment), specifically over the more visually perceptive gray scale range of 0 to 20 (i.e., out of 0–255 value) is achieved. The apparatus which implements the method is positioned intermediate a desktop publishing system and an image setter.

1 Claim, 11 Drawing Sheets

| 96 | 90 | 82 | 74 | 66 | 70 | 79 | 87 | 95 | 99 |
|---|---|---|---|---|---|---|---|---|---|
| 88 | 60 | 59 | 51 | 42 | 46 | 54 | 99 | 62 | 93 |
| 80 | 52 | 32 | 27 | 23 | 19 | 30 | 35 | 57 | 85 |
| 72 | 44 | 25 | 15 | 7 | 10 | 12 | 28 | 49 | 77 |
| 64 | 40 | 17 | 9 | 1 | 3 | 5 | 21 | 37 | 69 |
| 68 | 36 | 20 | 4 | 0 | 2 | 8 | 16 | 41 | 65 |
| 76 | 48 | 29 | 13 | 11 | 6 | 14 | 24 | 45 | 73 |
| 84 | 56 | 34 | 31 | 18 | 22 | 26 | 33 | 53 | 81 |
| 92 | 63 | 55 | 47 | 38 | 43 | 50 | 58 | 61 | 89 |
| 98 | 94 | 86 | 78 | 71 | 67 | 75 | 83 | 91 | 97 |

| 98 | 92 | 84 | 76 | 68 | 64 | 72 | 80 | 88 | 96 |
|----|----|----|----|----|----|----|----|----|----|
| 94 | 63 | 56 | 48 | 36 | 40 | 44 | 52 | 60 | 90 |
| 86 | 55 | 34 | 29 | 20 | 17 | 25 | 32 | 59 | 82 |
| 78 | 47 | 31 | 13 | 4  | 9  | 15 | 27 | 51 | 74 |
| 71 | 38 | 18 | 11 | 0  | 1  | 7  | 23 | 42 | 66 |
| 67 | 43 | 22 | 6  | 2  | 3  | 10 | 19 | 46 | 70 |
| 75 | 50 | 26 | 14 | 8  | 5  | 12 | 30 | 54 | 79 |
| 83 | 58 | 33 | 24 | 16 | 21 | 28 | 35 | 99 | 87 |
| 91 | 61 | 53 | 45 | 41 | 37 | 49 | 57 | 62 | 95 |
| 97 | 89 | 81 | 73 | 65 | 69 | 77 | 85 | 93 | 99 |

FIG. 12

| 98 | 92 | 84 | 76 | 68 | 64 | 72 | 80 | 88 | 96 |
|---|---|---|---|---|---|---|---|---|---|
| 94 | 63 | 56 | 48 | 36 | 40 | 44 | 52 | 60 | 90 |
| 86 | 55 | 34 | 29 | 20 | 17 | 25 | 32 | 59 | 82 |
| 78 | 47 | 31 | 13 | 9 | 9 | 15 | 27 | 51 | 74 |
| 71 | 38 | 18 | 11 | 9 | 9 | 9 | 23 | 42 | 66 |
| 67 | 43 | 22 | 9 | 9 | 9 | 10 | 19 | 46 | 70 |
| 75 | 50 | 26 | 14 | 9 | 9 | 12 | 30 | 54 | 79 |
| 83 | 58 | 33 | 24 | 16 | 21 | 28 | 35 | 99 | 87 |
| 91 | 61 | 53 | 45 | 41 | 37 | 49 | 57 | 62 | 95 |
| 97 | 89 | 81 | 73 | 65 | 69 | 77 | 85 | 93 | 99 |

FIG. 13

DIGITAL HALFTONING COMBINING DOT SIZE MODULATION SCREEN WITH DOT FREQUENCY MODULATION SCREEN WITHIN A SINGLE IMAGE

BACKGROUND OF THE INVENTION

The present invention is directed to the field of digital image processing to produce half-tone image data for driving a printing machine, such as an image setter which images films or plates to be printed on a flexo-press (a flexographic press), and is also directed to the use of halftone image screens to produce enhanced image data from the data provided from digital sources including desktop publishing outputs, scanner outputs and a digital camera outputs.

Digital halftoning is a computer graphics technique for producing an image, with many gray levels, on a binary imaging device in which the gray levels are approximated by black and white dots. The image presentation (character, shape, and shading) is achieved by changing percentage of area coverage (dot intensity) from region to region (pixel region to pixel region). Dot intensity is altered by altering dot size (amplitude—cluster dot pattern screening) or by altering dot density (frequency—dispersed dot pattern screening).

In digital halftoning systems and methods, dispersed dot patterns are created by error diffusion techniques (stochastic generators) which provide a randomized grain effect pattern. The size of the halftone dot, whose shape can vary from screen format to screen format, is fixed for a given screen. Lighter and darker (gray) values are created by varying the population density of the dots. Cluster dot patterns are generated by selecting a distance between halftone dots for the particular screen. Different gray values are achieved by varying the size of the dots. Conventional screen sets have been available with dot sizes that permit typically between 50 and 200 dots per inch.

Regardless of screen pattern selected, as pattern intensity is increased (percentage of area covered), image darkness an thereby resolution changes. With digital formats and digital implementation, and increase in gray value (number) results in an increased percent coverage.

In higher gray scale regions (darker) of an image generated, the cluster dot pattern screens have provided better visual acceptance of the imaging. In lower gray scale regions (lighter) of an image, the dispersed dot pattern screens have provided better visual acceptance of the imaging. It would therefore be logical to combine these two screens. However, when these two dot pattern screens have been combined to generate a single image, the transition between screen types has created an optically undesirable transition effect.

Moreover, In many reproduction processes, imaging dots below a specific size are not possible or problematic to generate and process. Therefore, reproducing gray levels in light tones is not possible or problematic, in such systems.

Flexographic press printing (relief printing with flexible rubber-like plates fastened to a cylinder) is a process in which the ability to achieve smaller imaged dot sizes has been limited. Typically, dot sizes have been limited to 40 microns or greater. Therefore, the definition quality of the printed image has been noticeably degraded in lighter areas.

What is desired is an improved digital imaging technique which provides enhanced digital imaging over the entire range of gray scale values, and specifically in low gray scale values.

What is also desired is an algorithm for implementing the digital technique which can enhance the image produced in lower gray levels (lighter areas of the image) when the smallest dot size available is not small enough to provide good images at those lower gray levels.

What is further desired is an apparatus to provide such enhanced digital imaging and for the implementation of the algorithm.

SUMMARY OF THE INVENTION

The objectives of the present invention are realized in a digital processor implemented structure which operates upon digital image data received from a continuous tone image source. Enhanced digital image data is provided in which there is a compensation for a lack of ability of processing and printing equipment to generate smaller dots normally needed for lower gray level imaging. The process carried out by the structure combines dot size modulation screening with dot frequency modulation screening in a single screening image by varying the density of the dots to improve reproduction of the light tones. The method uses dot size modulation (AM screening) to reproduce the image in the region higher gray scale values and then frequency modulates the output of the dot size screening in the lower gray scale values including that region of the image in which would normally require dot sizes below a user definable dot size limit.

Gray levels in regions below the user definable limit are achieved by randomly deleting a percentage of the population of the dots. Because the dot frequency modulation effect is created from the dot area (dot size modulation—AM screening) modulation screen, the transition from dot area modulation to dot frequency modulation is a continuous change (occurs gradually) over a range of gray values.

The implementation of randomly deleting a percentage of the population of the dots includes a threshold array of all dot sizes below the user defined minimum size. A second "null" value array is also used. In pixel processing an algorithm determines which array to access. If the threshold array is called, then a value from that array is chosen, If the null array is called then a nullity (i.e., a deleted dot) is chosen.

The values in the threshold array are enabled or disabled from the calculation as a function of the threshold value entered (dot size limit).

The structure in which the invention is resident implements a digital halftoning imaging method which produces enhanced lower gray scale imaging even when the dot size normally required for such lower gray scale imaging is not available.

DESCRIPTION OF THE DRAWINGS

The features, advantages and operation of the present invention will become readily apparent and further understood from a reading of the following detailed description with the accompanying drawings, in which like numerals refer to like elements, and in which:

FIG. 10 shows the dot pattern generated for gray scale values of 1 to 100 with the method and apparatus of the present invention;

FIG. 11 shows a base array;

FIG. 12 shows a 50% dot size threshold array; and

FIG. 13 shows a minimum array for a user selected minimum size of 10%.

DETAILED DESCRIPTION OF THE INVENTION

The present invention is a method of digital imaging by gray tone to halftone generation and thereafter by halftone processing which produces an enhanced digitally generated image output when the system hardware parameters have dot size limits above the definition desired in the image. The method and apparatus operates principally upon AM screening dots (size modulated dot pattern) and then frequency modulates the dot pattern to varying degrees of random deletion to generate resultant effects of size modulated dot pattern below the dot size limitations of the system hardware.

Figure 1:
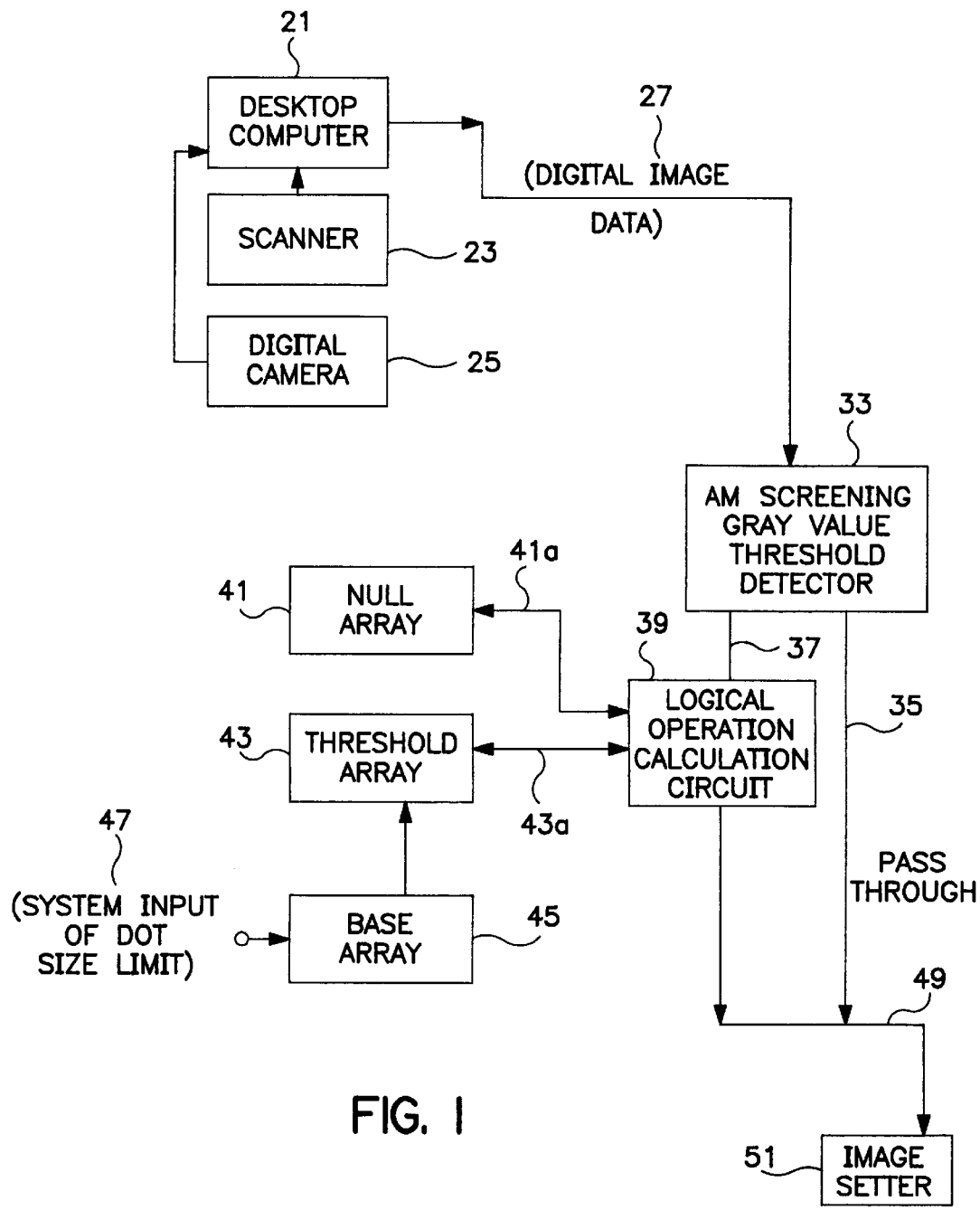
FIG. 1 shows a block diagram of the circuitry for implementing the present invention.

Digital continuous tone image data generated from any of a plurality of devices, FIG. 1, such as graphics from a desktop computer 21, images from a scanner 23 and images from a digital camera 25. The output from the scanner 23 and the output from a digital camera 25, are fed into the computer 21 which supplies the image data to the halftoning portion of the invention. The digital image data 27 is connected to be sent to an AM screening gray value threshold detector 33. In this circuit 33 dot area modulation screening is conducted. The halftone image data which has a value above the selected gray value, e.g. 10, is passed through 35 without further processing. The halftone image data which has a value below gray value 10 is sent 37 to a logical operation calculation circuit 39. In this circuit 39 dot frequency modulation is applied to the dot area modulated halftone data received from the circuit 33.

The threshold value (e.g. 10) is chosen at a percentage of the possible dot size pattern dictated by system minimum dot size. Typically, if minimum dot size is 40 microns on the plate (4% at 150 lines per inch dot size modulation screen) then this threshold is set at gray value of 4×2.55=10.

The logical operation calculation circuit 39 is connected to obtain values from a null array 41 via the decision line 41a, and a threshold array 43 via the decision line 43a, on an exclusive basis for each pixel. The values in the threshold array are loaded from a base array 45 as a function of the dot size limit value 47 input from the system parameters.

The output from the logical operation calculation circuit 39 is joined with the pass through output 35 from the AM screening gray value threshold detector circuit 33 to form composite image data 49, which is sent to the image setter 51 of a flexographic press printing system.

Figure 2:
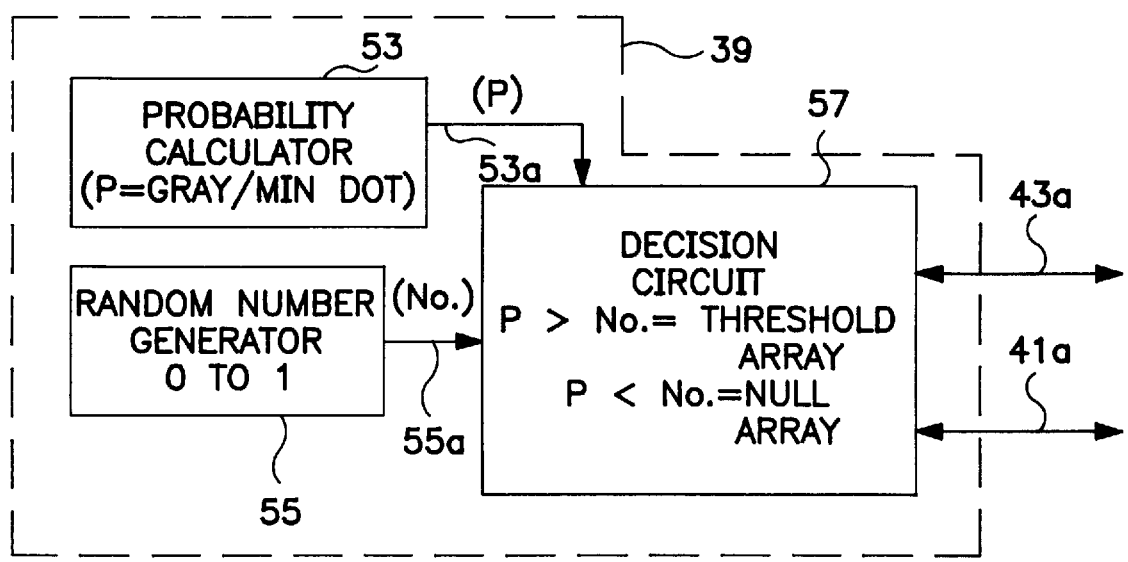
FIG. 2 shows a block diagram of the circuitry for implementing the logical operation calculation circuit of FIG. 1.

The circuitry, FIG. 2, implemented within the logical operation calculation circuit 39 includes a probability calculator 53 which calculates a probability value 53a as gray value divided by minimum dot size. A random number generator 55 generates number values 55a from 0 to 1. A decision circuit 57 receives both the probability value 53a and the current random number 55a. If the probability value 53a is greater than the random number 55a, the threshold array 43 is read via the decision line 43a. If the probability value 53a is less than the current random number 55a, the null array 41 is read via the decision line 41a.

Figure 3:
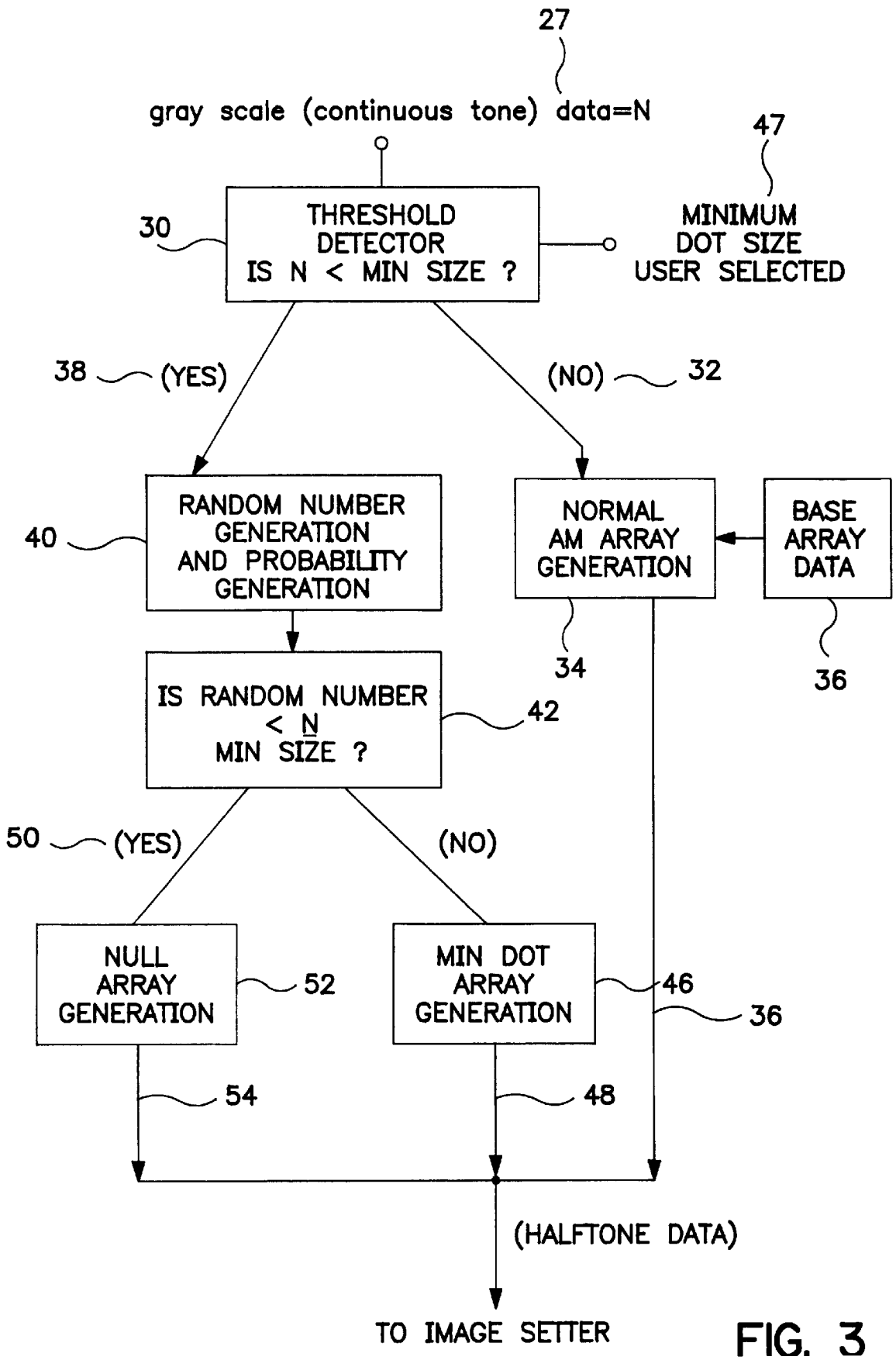
FIG. 3 shows the logic step operations carried on by the circuitry of FIG. 1.

The process steps carried out with the AM screening gray value threshold detector circuit 33, the logical operation calculation circuit 39 and the arrays 41, 43, 45 are shown in FIG. 3. The continuous tone (gray scale) image data 27 is designated as "N" in the logical operations and is obtained from the digital source. A minimum dot size 47 determined by the user is obtained. This minimum dot size 47 is designated in the logical steps as "MIN". It is the dot size necessary to do successful AM screening (dot size modulation). The value is empirically selected by the user base on equipment performance, after a engineering recommendation based on known equipment parameters.

The threshold detector operation determines if "N" is less than "MIN" step 30, FIG. 3. If no, 32, then the gray scale data is half-toned using a normal AM array which is generated 34 after obtaining the base array data 36. The output from the normal dot size modulation step 34 is sent 36 to the image setter with other composite data for the image.

If "N" is greater than "MIN" 38, then the a random number from 0 to 1 is generated. This random number is kept in this range because the other calculation figures are in that range. Also a "probability" value is generated. The "probability" is equal to the gray value divided by "MIN". These operations are designated as step 40.

Following this step 40, a determination is made if the random number is less than the "probability" ("N" divided by "MIN"), step 42. If no 44, then a "MIN" dot array is generated 46 and the data is operated upon using this "MIN" dot array, and then passed 48 onto the image setter as part of the composite halftoned image data.

If the random number is less than the "probability" 50, then a null array is generated and the data is operated upon using the null array, step 52. The output from this step 52 is passed 54 on to the image setter as part of the composite halftoned image data. This output component 54 is a nullity and determines the random deleted spaces.

Figure 3A:
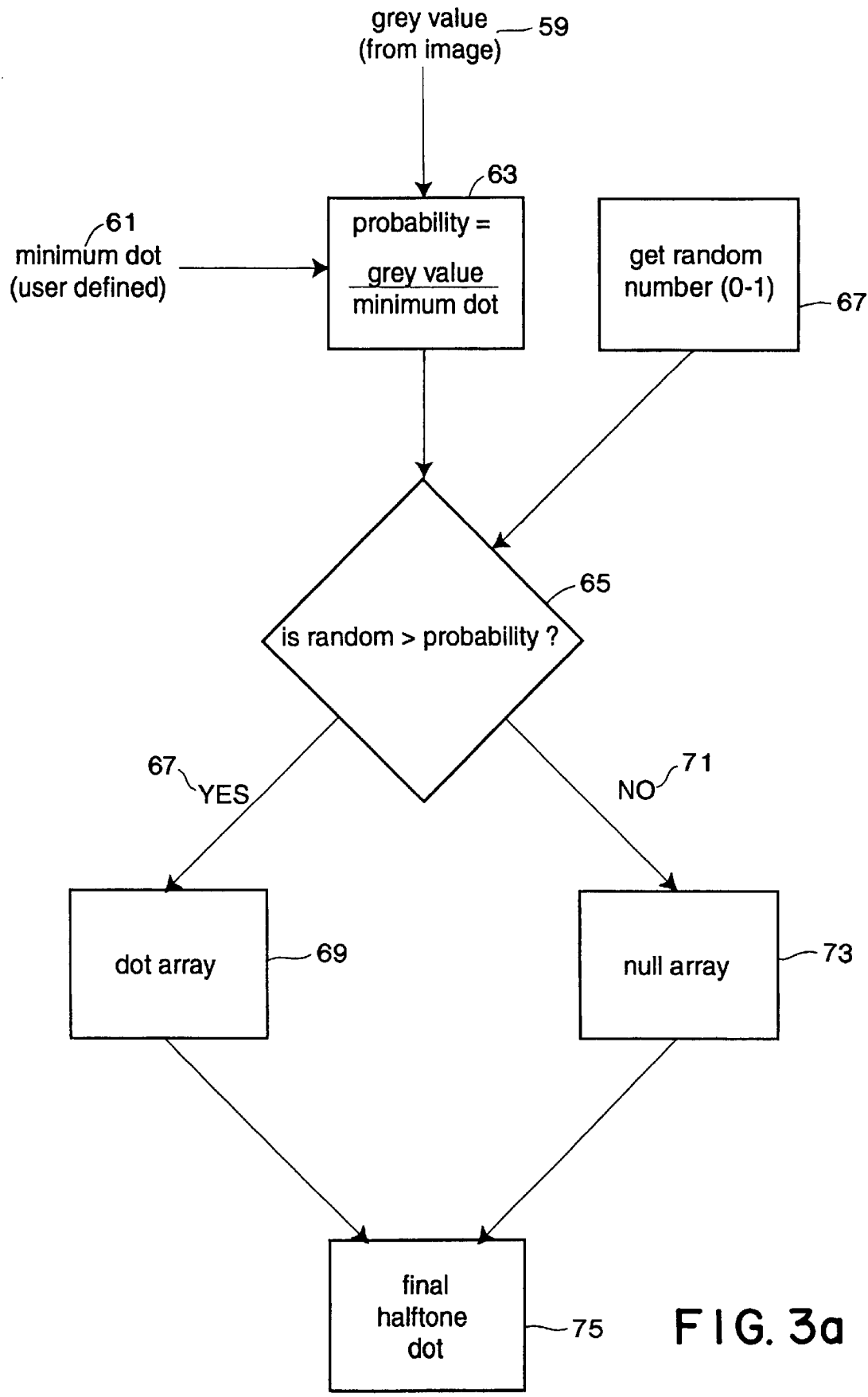
FIG. 3a shows the step operations carried on by the logical operation calculation circuit of FIG. 2 and is a detail of the random number and probability generation steps of FIG. 3.

The method steps carried out in steps 40, 42, 46 and 52 is shown in greater detail in FIG. 3a. Gray values are obtained, step 59, from the image data received. The minimum dot size information 61 which is user defined is also obtained 47. The probability value is calculated 63 and then fed to a decision step 65 which determines if that probability value is greater than a random number generated 67. If it is larger 67, the threshold dot array is read 69. If it is not larger 71, the null array is read 73. The reading of the dot array 69 or the null array 73 determines the final halftone dot characterization 75.

Figure 4:
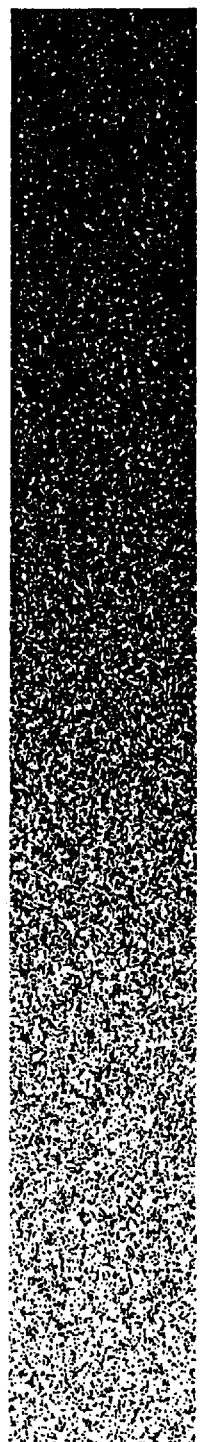
FIG. 4 shows a dot size modulation (AM screening) pattern for gray scale values from 1 to 100.
Figure 5:
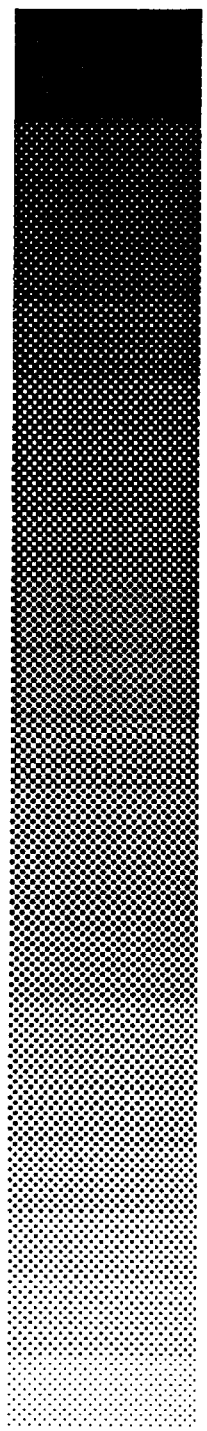
FIG. 5 shows a dot density (frequency) modulation (FM screening) pattern for gray scale values from 1 to 100.
Figure 6:
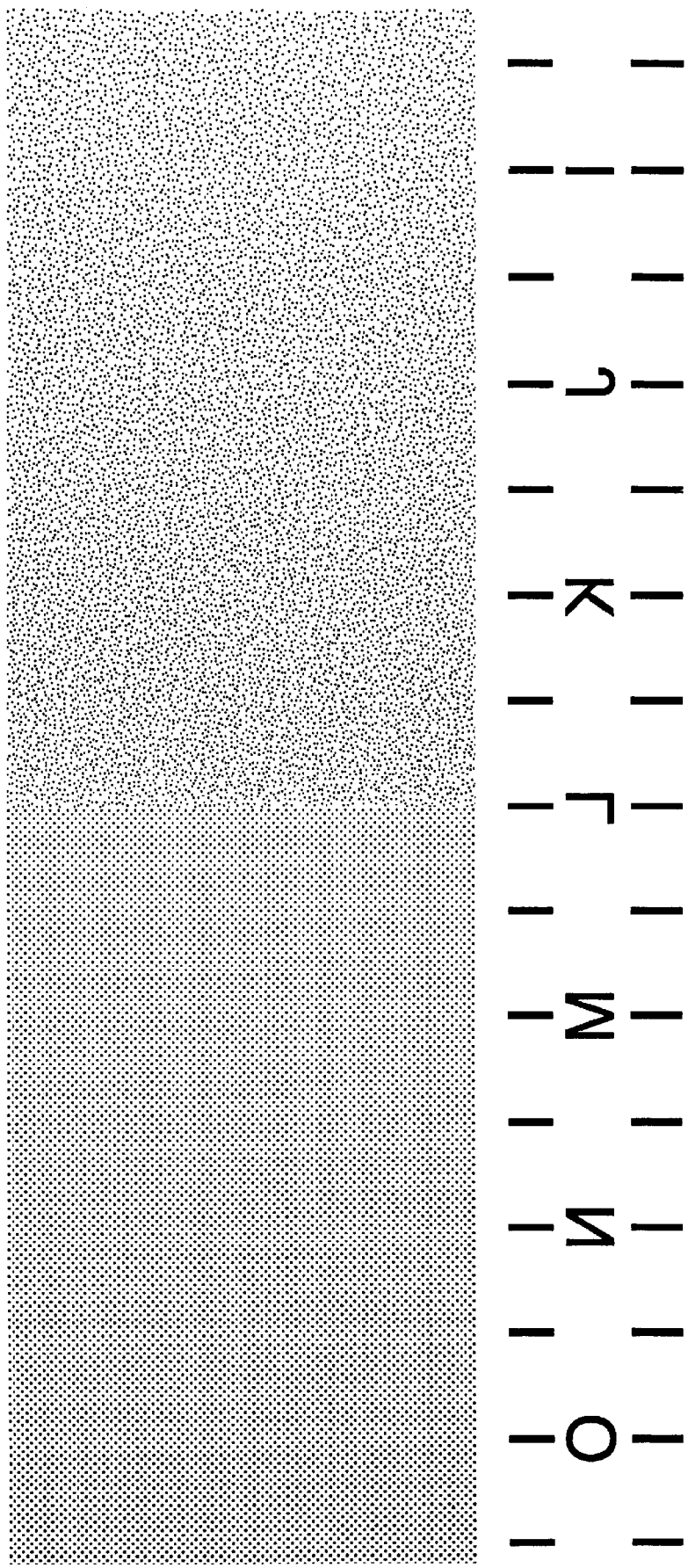
FIG. 6 shows the readily observable transition encountered when imaging is implemented with halftoning of FM screening and AM screening.
Figure 7:
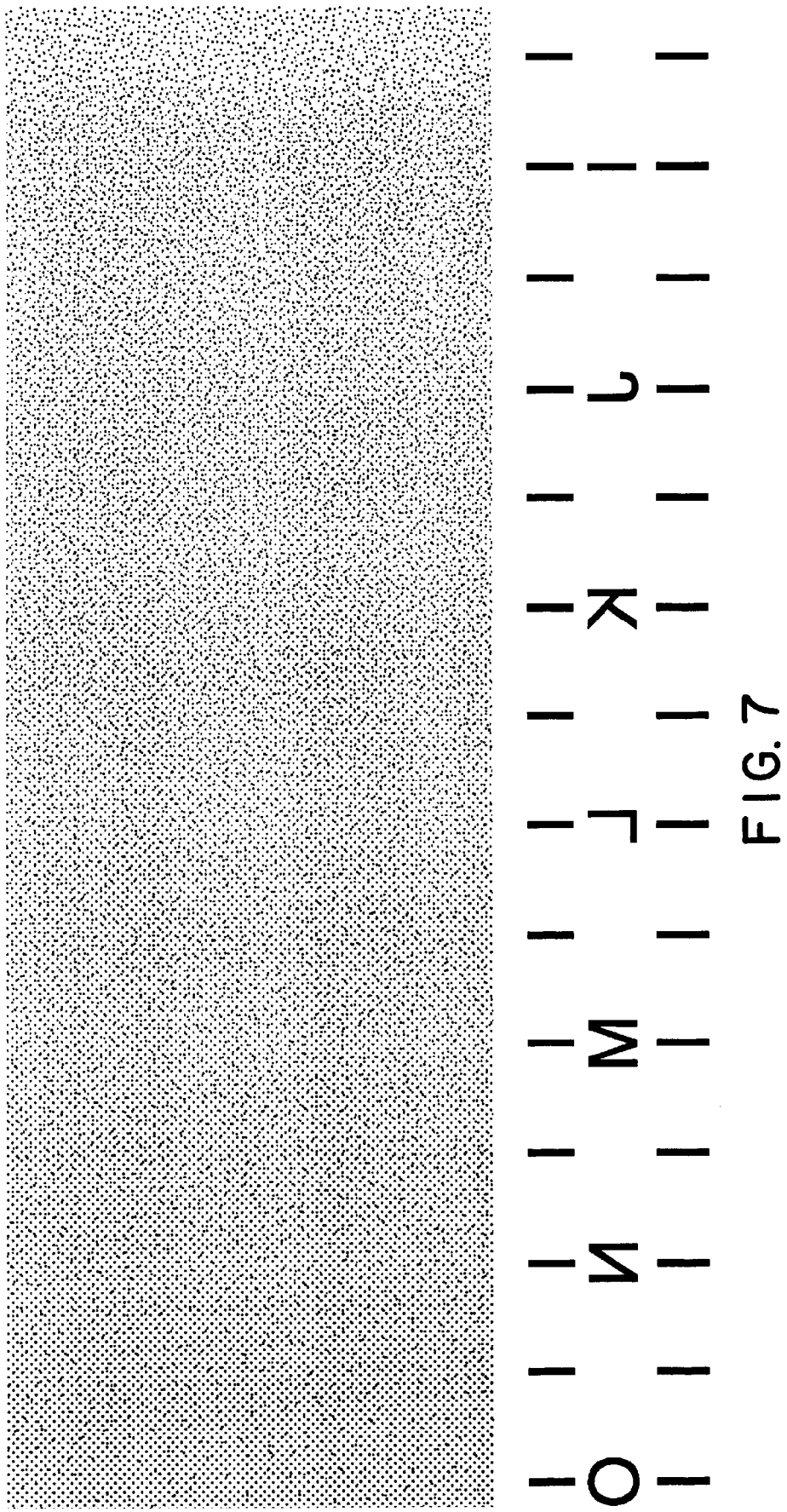
FIG. 7 shows a minimizing of the observable transition by gradual merging of AM and FM screening over a zone region where minimum dot size is of a significant value (e.g. 3% or higher)

The present invention does not use a dot size modulation screening pattern, FIG. 4, in its raw form for gray values from 1 to 100. Nor does it use a dot frequency modulation screening pattern, FIG. 5, in its raw form for gray values from 1 to 100. To mix these two patterns would create the composite hard threshold pattern, FIG. 6, or the gradual threshold pattern, FIG. 7. However, the gradual threshold pattern of FIG. 7 is not possible in flexographic printing systems where the smallness of the dot size is limited as being not possible or problematic.

In such flexographic systems, where dot size is limited to 40 microns (e.g. 4%), there is no ability for the equipment to normally reproduce a gray value of less than 4% (i.e., 1 to 4 on scale of 1 to 100).

Figure 8:
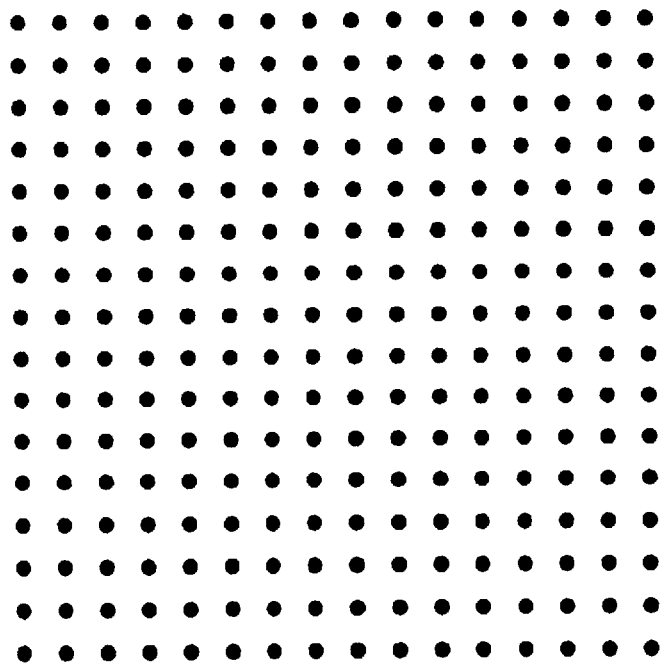
FIG. 8 shows an enlargement of a pattern of minimum size dot of 10%.
Figure 9:
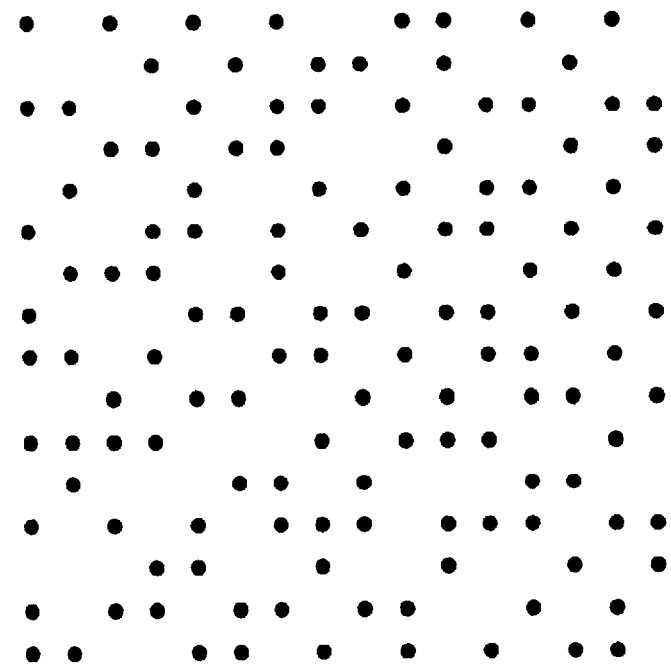
FIG. 9 shows the dot pattern of FIG. 8 with 50% of the dots randomly deleted, thereby yielding a resultant effect of a 5% dot size pattern.

However, the present invention can operate in a system which has a dot size limit of for example 10%, FIG. 8, and produce gray levels below this point by randomly deleting a percentage of the population of the dots, such that the visual result is a smaller dot. If the 10% dot pattern, FIG. 8, is reduced by 50%, a 5% dot pattern, FIG. 9, results.

Moreover, because the dot frequency modulation effect of this invention is created from the dot area modulation screen, the transition from dot area modulation to dot frequency modulation occurs gradually over the range of gray values. A 9% dot density is created by deleting 10% of the 10% dots; an 8% dot is created by deleting 20% of the 10% dots.

The resultant screen pattern, FIG. 10, has a transition from dot size modulation to dot density modulation which is not visually objectionable.

In a normal screening process a gray value is converted to a dot through an AM array generation from the base array shown in FIG. 11. This array, FIG. 11, shows the values for a 10 by 10 array. The values in each block of the array signify a percentage of coverage for that pixel, i.e., dot density from 0% to 99%. A gray level input to the array, FIG. 11, produces a dot with all values in the array below a value set to 1 and all values above the threshold set to 0. As such, each gray level produces a different dot shape.

A 50% dot contains all the values below 50 set to 1, FIG. 12, shaded region. This FIG. 12 illustrates a 50% dot threshold array. The shaded portion defines the threshold array 43, FIG. 1, values for these parameters (i.e., 50% dot). When the minimum dot value (dot size limit) is set to 10%, the threshold array 43, FIG. 1, looks like the shaded portion of the base array shown in FIG. 13.

The array shown is FIG. 13 is the "MIN" array generated in step 46 of FIG. 3 and is the dot array 69 step shown in FIG. 3a for the 10% dot size limit. The blocks in the shaded region all show a number less than the threshold number, i.e., the "probability" equalling "N" divided by "MIN". These blocks in the shaded region are then set equal to the threshold number.

Many changes can be made in the above-described invention without departing from the intent and scope thereof. It is thereby intended that the above description be read in the illustrative sense and not in the limiting sense.

What is claimed is:

1. In a digital halftoning imaging system for press imaging equipment, a method of generating a dot density modulation screen from a dot size modulation screen within the same image, comprising the steps of:

receiving a minimum dot size and setting it as a threshold value;

receiving a base array for generating dot size modulation halftone screening;

generating a minimum detection array using the minimum dot size threshold value set and the base array received;

receiving continuous tone gray value digital image data;

determining if the gray value of the image data is less than the minimum dot size threshold value;

if the gray value is not less than the minimum dot size threshold value, then obtaining the base array and generating halftone AM (dot size modulation) screening of the image data;

if the gray value is less than the minimum dot size threshold value, then calculating a probability value equal to the gray value divided by the minimum dot size threshold value;

generating a random number in the range of 0 to 1;

determining if the probability value is less than the random number;

if the probability is less than the random number, then generating a null array and generating a halftone AM screening of the image data using that null array;

if the probability is greater than the random number, then generating a minimum dot size threshold value array and generating a halftone AM screening of the image data using that minimum dot array; and compositing the individually processed halftone image data into image information for use by press imaging equipment.

* * * * *